United States Patent
Whelan et al.

(10) Patent No.: US 11,423,033 B2
(45) Date of Patent: *Aug. 23, 2022

(54) STACK TRACE SEARCH

(71) Applicant: Palantir Technologies Inc., Palo Alto, CA (US)

(72) Inventors: Kevin Whelan, Palo Alto, CA (US); Ranajay Sen, Palo Alto, CA (US)

(73) Assignee: Palantir Technologies Inc., Palo Alto, CA (US)

(*) Notice: Subject to any disclaimer, the term of this patent is extended or adjusted under 35 U.S.C. 154(b) by 159 days.

This patent is subject to a terminal disclaimer.

(21) Appl. No.: 16/820,183

(22) Filed: Mar. 16, 2020

(65) Prior Publication Data

US 2020/0265053 A1 Aug. 20, 2020

Related U.S. Application Data

(63) Continuation of application No. 15/376,355, filed on Dec. 12, 2016, now Pat. No. 10,628,428.

(51) Int. Cl.
*G06F 16/2457* (2019.01)
*G06F 16/22* (2019.01)
(Continued)

(52) U.S. Cl.
CPC ........ *G06F 16/24575* (2019.01); *G06F 16/22* (2019.01); *G06F 16/248* (2019.01); *G06F 16/2455* (2019.01)

(58) Field of Classification Search
CPC .. G06F 16/2457; G06F 16/22; G06F 16/2455; G06F 16/248
See application file for complete search history.

(56) References Cited

U.S. PATENT DOCUMENTS 6,980,984 B1 12/2005 Huffman et al.
7,657,540 B1 2/2010 Bayliss
(Continued)

FOREIGN PATENT DOCUMENTS

EP 3037992 A1 6/2016

OTHER PUBLICATIONS

"U.S. Appl. No. 15/376,355, Examiner Interview Summary dated Jul. 17, 2019", 3 pgs.
(Continued)

*Primary Examiner* — Hau H Hoang
(74) *Attorney, Agent, or Firm* — Schwegman Lundberg & Woessner, P.A.

(57) ABSTRACT

An error management system can provide search results based on a received stack trace. For example, the error management system receives, from a client device, a search query including a stack trace. The error management system parses the search query to identify at least a first class and one or more errors associated with the first class, yielding a parsed search query. The error management system searches a class mapping table based on the parsed search query. The class mapping table includes a listing of classes and corresponding links to source code. The error management system searches an error discussion database based on the parsed search query. The error discussion database includes one or more user generated postings regarding programming errors. The error management system provides, to the client device, search results resulting from searching the class mapping table and the error discussion database.

20 Claims, 5 Drawing Sheets

(51) Int. Cl.
*G06F 16/248* (2019.01)
*G06F 16/2455* (2019.01)

(56) References Cited

U.S. PATENT DOCUMENTS

| | | |
|---|---|---|
| 7,899,796 B1 | 3/2011 | Borthwick et al. |
| 7,900,052 B2 | 3/2011 | Jonas |
| 9,009,539 B1 | 4/2015 | Kompotis et al. |
| 9,348,920 B1 | 3/2016 | Kesin |
| 10,628,428 B1 | 4/2020 | Whelan et al. |
| 2002/0083039 A1 | 6/2002 | Ferrari et al. |
| 2007/0130206 A1 | 6/2007 | Zhou et al. |
| 2008/0071731 A1 | 3/2008 | Ma et al. |
| 2009/0024589 A1 | 1/2009 | Sood et al. |
| 2010/0106705 A1 | 4/2010 | Rush et al. |
| 2010/0114887 A1 | 5/2010 | Conway et al. |
| 2011/0258190 A1 | 10/2011 | Chen et al. |
| 2012/0159312 A1 | 6/2012 | Mital et al. |
| 2012/0278273 A1 | 11/2012 | Fang |
| 2013/0304770 A1 | 11/2013 | Boero et al. |
| 2014/0330845 A1 | 11/2014 | Feldschuh |
| 2014/0379755 A1 | 12/2014 | Kuriakose |
| 2016/0042275 A1 | 2/2016 | Dettran et al. |

OTHER PUBLICATIONS

"U.S. Appl. No. 15/376,355, Examiner Interview Summary dated Dec. 7, 2018", 3 pgs.

"U.S. Appl. No. 15/376,355, Final Office Action dated Apr. 1, 2019", 17 pgs.

"U.S. Appl. No. 15/376,355, Non Final Office Action dated Aug. 16, 2018", 16 pgs.

"U.S. Appl. No. 15/376,355, Notice of Allowance dated Dec. 16, 2019", 7 pgs.

"U.S. Appl. No. 15/376,355, Response filed Dec. 14, 2018 to Non Final Office Action dated Aug. 16, 2018", 17 pgs.

"U.S. Appl. No. 15/376,355, Response filed Aug. 1, 2019 to Final Office Action dated Apr. 1, 2019", 13 pgs.

"Managing Source and Class Files", Oracle Java Documentation, [Online], Retrieved from the Internet: <URL: https://docs.oracle.com/javase/tutorial/java/package/managingfiles.htmb, (Nov. 23, 2011), 3 pgs.

STACK TRACE SEARCH

PRIORITY APPLICATION

This application claims priority to U.S. patent application Ser. No. 15/376,355, filed Dec. 12, 2016, the disclosure of which is incorporated herein in its entirety by reference.

TECHNICAL FIELD

The present disclosure generally relates to the technical field of special-purpose machines that generate search results, including computerized variants of such special-purpose machines and improvements to such variants, and to the technologies by which such special-purpose machines become improved compared to other special-purpose machines that generate search results. In particular, the present disclosure addresses systems and methods for generating search results based on a stack trace.

BACKGROUND

A stack trace provides a programmer with a report of the active stack frames at a certain point during execution of a program. Programmers commonly use the stack trace during debugging to identify problems with the code. For example, a stack trace may be displayed as part of an error message. In some instances, a programmer may not have written a portion of the code and therefore the results of the stack trace may be difficult to understand. Further, a stack trace and error message often include a large amount of common and/or irrelevant data that makes it difficult to search for additional information pertaining to the error.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
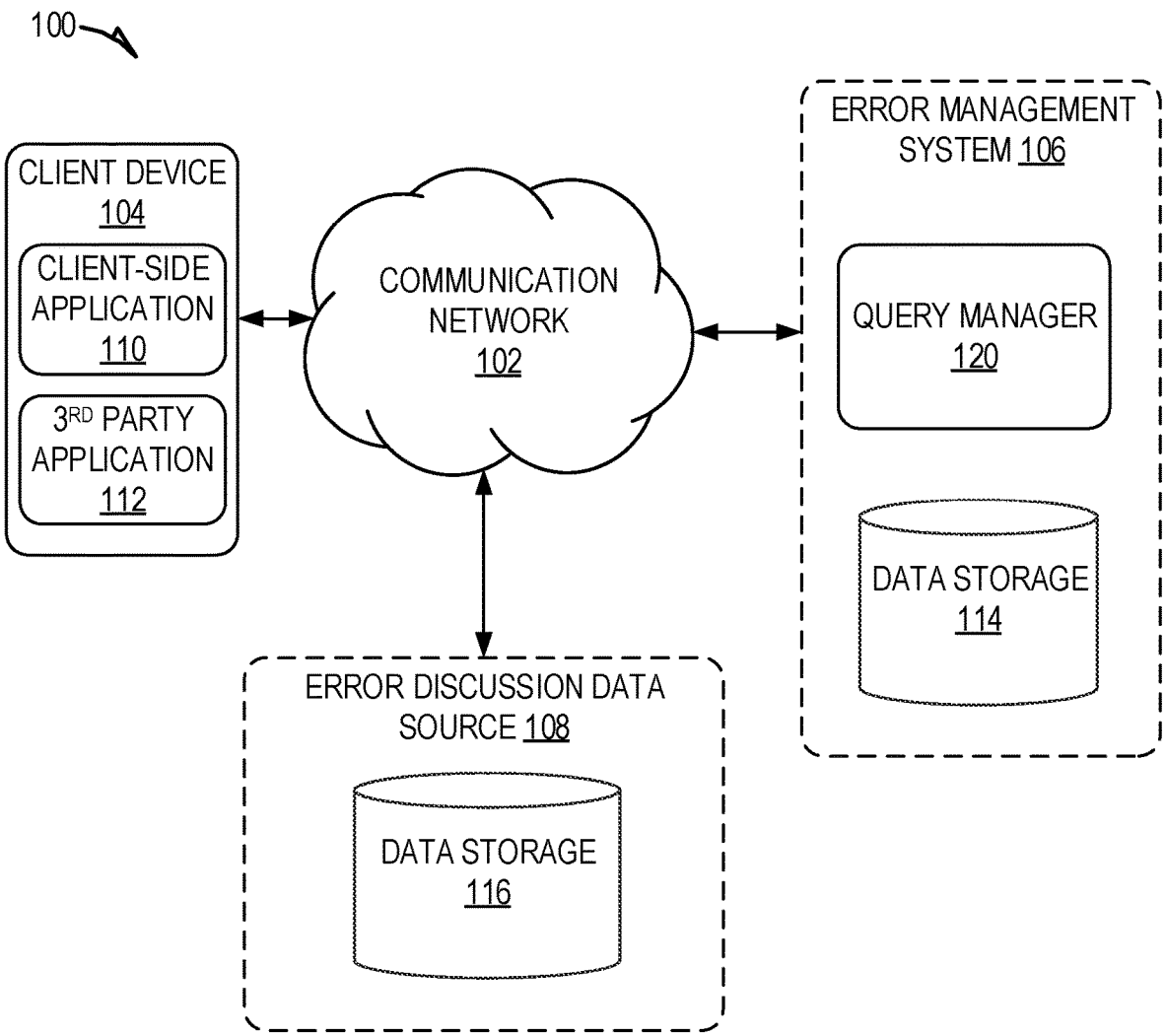
FIG. 1 shows an exemplary system for generating search results based on a stack trace, according to some example embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are systems, methods, and computer-readable storage media for generating search results based on a stack trace. As discussed above, a stack trace provides a programmer with a report of the active stack frames at a certain point during execution of a program. Programmers commonly use the stack trace during debugging to identify problems with the code. For example, a stack trace may be displayed as part of an error message. In some instances, a programmer may not have written a portion of the code and therefore the results of the stack trace may be difficult to understand. Further, a stack trace and error message often include a large amount of common and/or irrelevant data that makes it difficult to search for additional information pertaining to the specific error.

An error management system can provide search results based on a received stack trace. The error management system can receive, from a client device, a search query including a stack trace. For example, the error management system can provide a user's client device with a search interface that enables the user to copy and paste a stack trace as a search query in the search interface. Once the search query is submitted by the user, the user's client device can transmit the search query to the error management system.

The search query can include a large amount of irrelevant or common data, such as timestamps, common errors, etc., that are not useful in searching for information relevant to the user's specific errors. Accordingly, the error management system can parse the search query to identify valuable terms or phrases and remove irrelevant or common data. For example, the error management system can parse the search query to identify at least a first class and one or more errors associated with the first class, yielding a parsed search query. Additionally, the error management system can remove common terms, such as timestamps or common errors.

The error management system can search a class mapping table based on the parsed search query. The class mapping table can include a listing of classes and corresponding links to source code. The error management system can search the class mapping table to identify a set of links corresponding to the first class identified in the parsed search query.

The error management system can also search an error discussion database based on the parsed search query. The error discussion database can be any type of database, data source, etc., that maintains one or more user generated postings. For example the error discussion data base include one or more user generated postings regarding programming errors. The error management system can search the error discussion database to identify a set of user generated postings that include the first class. The error management system can then prioritize the set of user generated postings based on a number of errors included in the parsed search query that are included in each user generated posting from the set of user generated postings, yielding a prioritized set of user generated postings.

The error management system can provide, to the client device, search results resulting from searching the class mapping table and the error discussion database. For example, the error management system can transmit, to the client device, the set of links corresponding to the first class. The client device can present the set of links on a display of the client device thereby enabling a user of the client device to select a link from the set of links to access source code corresponding to the first class. The error management system can also transmit, to the client device, the prioritized set of user generated postings. The client device can present the prioritized set of user generated postings on a display of the client device, thereby allowing the user to view the various user generated postings.

FIG. 1 shows an exemplary system 100 for providing search results based on a received stack trace. While system 100 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of system 100 are discussed in a singular sense, multiple instances of one or more of the various functional components may be employed.

As shown, system 100 can include multiple computing devices connected to communication network 102 and configured to communicate with each other through use of communication network 102. Communication network 102 can be any type of network, including a local area network ("LAN"), such as an intranet, a wide area network ("WAN"), such as the internet, or any combination thereof. Further, communication network 102 can be a public network, a private network, or a combination thereof. Communication network 102 can also be implemented using any number of communication links associated with one or more service providers, including one or more wired communication links, one or more wireless communication links, or any combination thereof. Additionally, communication network 102 can be configured to support the transmission of data formatted using any number of protocols.

Multiple computing devices can be connected to communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIG. 5.

To facilitate communication with other computing devices, a computing device can include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, system 100 can include client device 104, error management system 106 and error discussion data source 108. In system 100, a user can interact with error management system 106 through client device 104 connected to communication network 102 by direct and/or indirect communication. Client device 104 can be any of a variety of types of computing devices that include at least a display, a computer processor, and communication capabilities that provide access to communication network 102 (e.g., a smart phone, a tablet computer, a personal digital assistant (PDA), a personal navigation device (PND), a handheld computer, a desktop computer, a laptop or netbook, or a wearable computing device).

Error management system 106 can consist of one or more computing devices and support connections from a variety of different types of client devices 104, such as desktop computers; mobile computers; mobile communications devices (e.g. mobile phones, smart phones, tablets, etc.); smart televisions; set-top boxes; and/or any other network enabled computing devices. Client device 104 can be of varying type, capabilities, operating systems, etc. Furthermore, error management system 106 can concurrently accept connections from and interact with multiple client devices 104.

A user can interact with error management system 106 via client-side application 110 installed on client device 104. In some embodiments, client-side application 110 can include an error management system 106 specific component. For example, the component can be a stand-alone application, one or more application plug-ins, and/or a browser extension. However, the user can also interact with error management system 106 via third-party application 112, such as a web browser, that resides on client device 104 and is configured to communicate with error management system 106. In either case, client-side application 110 and/or third party application 112 can present a user interface (UI) for the user to interact with high functionality content management system 106.

Error management system 106 can include data storage 114 to store data. The stored data can include any type of data, such as digital data, documents, text files, audio files, video files, etc. Data storage 114 can be a storage device, multiple storage devices, or one or more servers. Alternatively, data storage 114 can be a cloud storage provider or network storage. Error management system 106 can store data in a network accessible storage (SAN) device, in a redundant array of inexpensive disks (RAID), etc. Date storage 110 can store data items using one or more partition types, such as FAT, FAT32, NTFS, EXT2, EXT3, EXT4, ReiserFS, BTRFS, and so forth.

Error management system 106 can include query manager 120 configured to provide a user with search results based on a received stack trace. Query manager 120 can provide client device 104 with a search interface that allows a user to enter a search query including a stack trace. For example, a user of client device 104 can copy and paste a stack trace or an error message including a stack trace into an input field in the search interface. The submitted search query can then be transmitted by client device 104 to error management system 106.

Query manager 120 can parse a search query received from client device 104 to identify valuable terms or phrases and remove irrelevant or common data. A stack trace can include a large amount of irrelevant or common data, such as timestamps, common errors, etc., that are either meaningless to the underlying error or too common to provide targeted or relevant search results. Accordingly, query manager 120 can parse the search query to identify valuable terms or phrases and remove irrelevant or common data. For example, query manager 120 can identify valuable terms such as programming classes and errors corresponding the identified programming classes. Query manager 120 can also remove common terms, such as timestamps or common errors. The parsing can result in a parsed search query that includes valuable terms that are more likely to produce meaningful search results.

Query manager 120 can search multiple sources based on the parsed search query. For example, the query manager 120 can search a class mapping table that includes a listing of classes and corresponding links to source code. For example, the links can be Uniform Resource Locator (URL) links to source code for the class corresponding to the link.

The class mapping table can be stored in data storage 114. Query manager 120 can communicate with data storage 114 to search the class mapping table based on the parsed search query. For example, the query manager 120 can search the class mapping table to identify a set of links corresponding to identified classes in the parsed search query.

Query manager 120 can also search error discussion data source 108 based on the parsed search query. Error discussion data source 108 can include a listing of user generated posting regarding programming errors. For example, error discussion data source 108 can include postings made by users using a collaboration tool that allows users to post messages asking questions and answering other users' questions. The collaboration tool can include third party collaboration tools (e.g., SLACK), as well as in-house developed proprietary collaboration tools. In many cases, users may have previously used collaboration tools to discuss errors that are relevant to a user's search query. For example, users may have pasted errors or stack traces into a message and asked other users for help with the issue. Query manager 120 can search error discussion data source 108 based on the parsed search query to provide a user with user generated postings that may be relevant or of use to the user.

Discussion data source 108 can include data storage 116 that stores user generated postings. Query manager 120 can communicate with error discussion data source 108 to search data storage 116 based on the parsed search query. For example, query manager 120 can search data storage 116 for user generated postings that include classes that are included in the parsed search query.

In some instances, searching error discussion data source 108 can result in a high number of user generated postings. Accordingly, query manager 120 can prioritize the user generated postings to provide the user with user generated postings that may be of greater relevance to the user's query. For example, query manager 120 can prioritize the user generated postings based on a number or percentage of errors included in parsed search query that are also included the user generated posting. User generated postings that include a higher number or percentage of the errors included in the parsed search query can be prioritized higher that user generated postings that include a lower number or percentage of the errors.

Although only a single error discussion data source 108 is shown, this is only for ease of explanation and is not meant to be limiting. Query manager 120 can search any number of error discussion data sources and this disclosure envisions all such possibilities.

Query manager 120 can provide the search results resulting from searching the class mapping table and error discussion data source 108 to client device 104. For example, query manager 120 can can transmit, to client device 104, the set of links corresponding to classes included in the parses search query. Client device 104 can present the set of links on a display of client device 104, thereby enabling a user of client device 104 to select a link from the set of links to access source code corresponding to a selected class.

Query manager 120 can also transmit, to client device 104, the user generated postings. Client device 104 can present the user generated postings on the display of client device 104, thereby allowing the user to scroll through the user generated postings for pertinent information. The user generated postings can be displayed according to the prioritization determined by query manager 120 such that user generated posting with a higher priority are presented first or higher than user generated postings with a lower priority.

Figure 2:
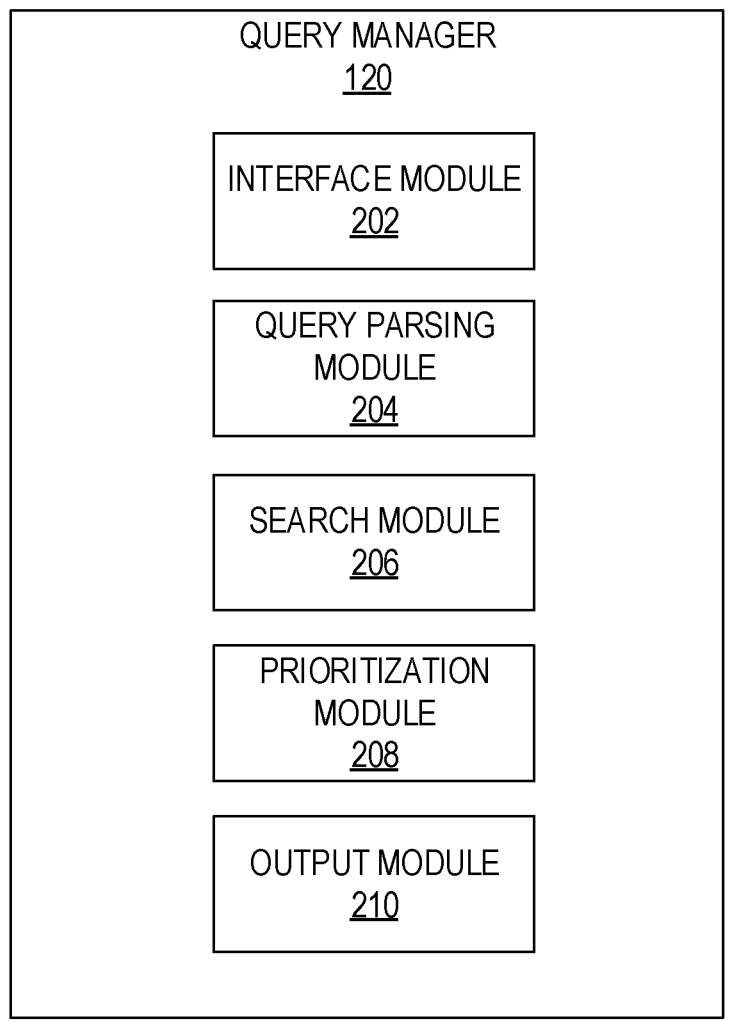
FIG. 2 shows an example block diagram of a query manger, according to some example embodiments.

FIG. 2 shows an example block diagram of query manger 120. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by query manager 120 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, query manger 120 includes interface module 202, query parsing module 204, search module 206, prioritization module 208 and output module 210. Interface module 202 can provide a user with a search interface that enables a user to enter a search query and view resulting search results. The search interface can provide the user with a user interface elements, such as a text boxes, buttons, check boxes, etc., that allow a user to enter a search query and view resulting search results. For example, the search interface can include a text box that a user can use to manually enter and/or copy and paste a search query, such as stack trace or error message. The search interface can further include a button that allows the user to submit the entered search query, causing client device 104 to transmit the entered search query to error management system 106.

Query parsing module 204 can parse a received search query to generate a parsed search query. Query parsing module 204 can generate the parsed search query by identifying valuable terms or phrases and removing irrelevant or common data. For example, query parsing module 204 can parse the search query to identify one or more programming classes and one or more errors associated with the programming classes.

Query parsing module 204 can identify the programming classes and errors based on an analysis of the search query to identify known syntax indicating that a term or phrase identifies a class or error. For example, query parsing module 204 can identify terms, such as 'class' or 'error', indicating that a preceding or following term or phrase is a class or error. As another example, query parsing module 204 can identify syntax, such as symbols, indicating that a term or phrase included within, after or before the syntax is a class or error. In some embodiments, query parsing module 204 can utilize a listing of known classes and errors to identify classes and errors in the search query.

Query parsing module 204 can identify common or irrelevant data using similar techniques. For example, query parsing module 204 can analyse the search query to identify known syntax indicating that a term or phrase is common or irrelevant data. For example, query parsing module 204 can identify terms, such as 'timestamp', indicating that a preceding or following term or phrase is a timestamp. As another example, query parsing module 204 can identify syntax, such as symbols, indicating that a term or phrase included within, after or before the syntax is common or irrelevant data.

In some embodiments, query parsing module 204 can utilize a listing of known common or irrelevant data, such as a listing or common errors, terms, etc. Query parsing module 204 can compare terms and/or phrases in the search query with the listing of known common or irrelevant data to identify terms and/or phrases in the search query that should be removed.

Search module 206 can search one or more data sources based on the parsed search query. For example, search module 206 can search a class mapping table based on the parsed search query. The class mapping table can include a listing of classes and corresponding links to source code. Search module 206 can search the class mapping table to identify a set of links corresponding to classes identified in the parsed search query.

Search module 206 can also search one or more error discussion database based on the parsed search query. Each error discussion database can include one or more user generated postings regarding programming errors. Search module 206 can search the error discussion database to identify a set of user generated postings that include classes identified in the parsed search query.

Prioritization module 208 can prioritize the identified set of user generated postings to generate a prioritized set of user generated postings. Prioritization module 208 can prioritize the user generated postings based on a number of errors included in the parsed search query that are included in each user generated posting from the set of user generated postings. For example, prioritization module 208 can prioritize user generated postings that include a higher number or percentage of the errors included in the parsed search query.

Output module 210 can provide the search results to client device 104. For example, output module 210 can can transmit, to client device 104, the set of links corresponding to classes included in the parses search query. Client device 104 can present the set of links on a display of client device 104, thereby enabling a user of client device 104 to select a link from the set of links to access source code corresponding to a selected class.

Output module 210 can also transmit, to client device 104, the prioritized set of user generated postings. Client device 104 can present the prioritized set of user generated postings on the display of client device 104, thereby allowing the user to scroll through the user generated postings for pertinent information.

Figure 3:
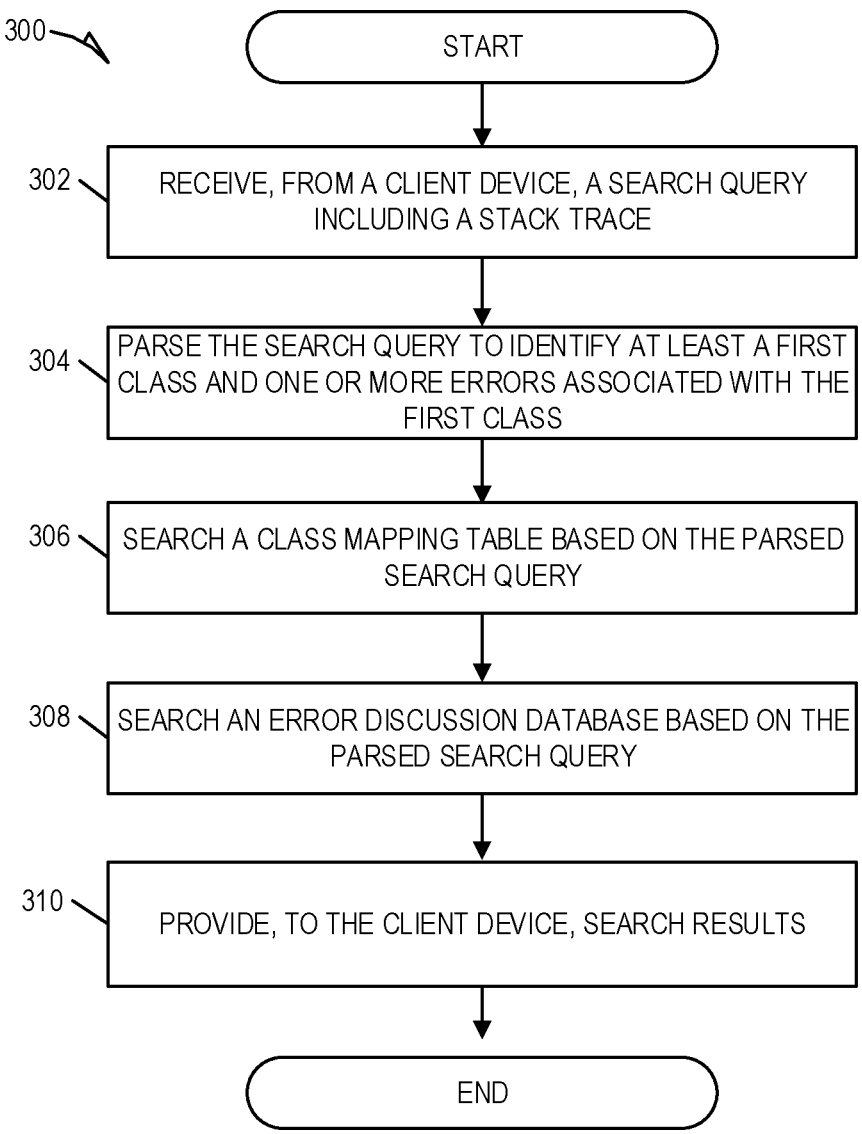
FIG. 3 shows an example method for generating search results based on a stack trace, according to some example embodiments.

FIG. 3 shows an example method for generating search results based on a stack trace, according to some example embodiments. Method 300 may be embodied in computer readable instructions for execution by one or more processors such that the operations of method 300 may be performed in part or in whole by query manager 120; accordingly, method 300 is described below by way of example with reference thereto. However, it shall be appreciated that at least some of the operations of method 300 may be deployed on various other hardware configurations and method 300 is not intended to be limited to query manager 120.

At operation 302, interface module 202 receives, from client device 104, a search query including a stack trace. Interface module 202 can provide client device 104 with a search interface that enables the user to copy and paste a stack trace as a search query in the search interface. Once the search query is submitted by the user in the search interface, client device 104 transmits the search query to error management system 106.

At operation 304, query parsing module 204 parses the search query to identify at least a first class and one or more errors associated with the first class. The search query can include a large amount of irrelevant or common data, such as timestamps, common errors, etc., that are not useful in searching for information relevant to the user's specific errors. Accordingly, query parsing module 204 can parse the search query to identify valuable terms or phrases and remove irrelevant or common data. Parsing the search query yields a parsed search query.

At operation 306, search module 206 searches a class mapping table based on the parsed search query. The class mapping table can include a listing of classes and corresponding links to source code. Search module 206 can search the class mapping table to identify a set of links corresponding to the first class identified in the parsed search query.

At operation 308, search module 206 searches an error discussion database based on the parsed search query. The error discussion database can include one or more user generated postings regarding programming errors. The error management system can search the error discussion database to identify a set of user generated postings that include the first class.

At operation 310, output module 210 provides, to client device 104, search results resulting from searching the class mapping table and the error discussion database. For example, output module 210 can transmit, to client device 104, the set of links corresponding to the first class. Client device 104 can present the set of links on a display of client device 104, thereby enabling a user of client device 104 to select a link from the set of links to access source code corresponding to the first class. Output module 210 can also transmit, to client device 104, the set of user generated postings and client device 104 can present the set of user generated postings on a display of the client device, thereby allowing the user to view the various user generated postings.

Figure 4:
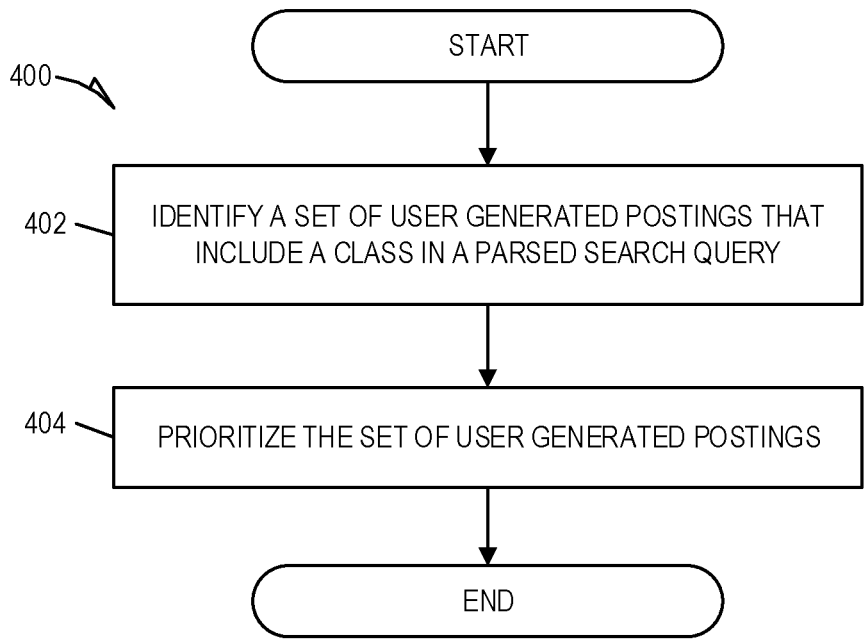
FIG. 4 shows an example method for searching an error discussion database, according to some example embodiments.

FIG. 4 shows an example method 400 for searching an error discussion database, according to some example embodiments. Method 400 may be performed as part of method 300. For example, method 400 may be performed as part of operation 308. Method 400 may be embodied in computer readable instructions for execution by one or more processors such that the operations of method 400 may be performed in part or in whole by query manager 120; accordingly, method 400 is described below by way of example with reference thereto. However, it shall be appreciated that at least some of the operations of method 400 may be deployed on various other hardware configurations and method 400 is not intended to be limited to query manager 120.

At operation 402, search module 206 identifies a set of user generated postings that include a class in a parsed search query. For example, search module 206 can communicate with error discussion data source 108 to search for user generated postings stored in data storage 116 that include the class.

At operation 404, prioritization module 208 prioritizes the set of user generated postings based on a number of errors included in the parsed search query that are included in each user generated posting from the set of user generated postings. For example, prioritization module 208 can assign a higher priority to user generated postings that include a higher number or percentage of the errors included in the parsed search query. The prioritization can yield a prioritized set of user generated posting that can be presented to a user. As a result of the prioritization, the user can be presented with user generated postings that are more likely to be relevant or of use to the user based on the user's search query.

Figure 5:
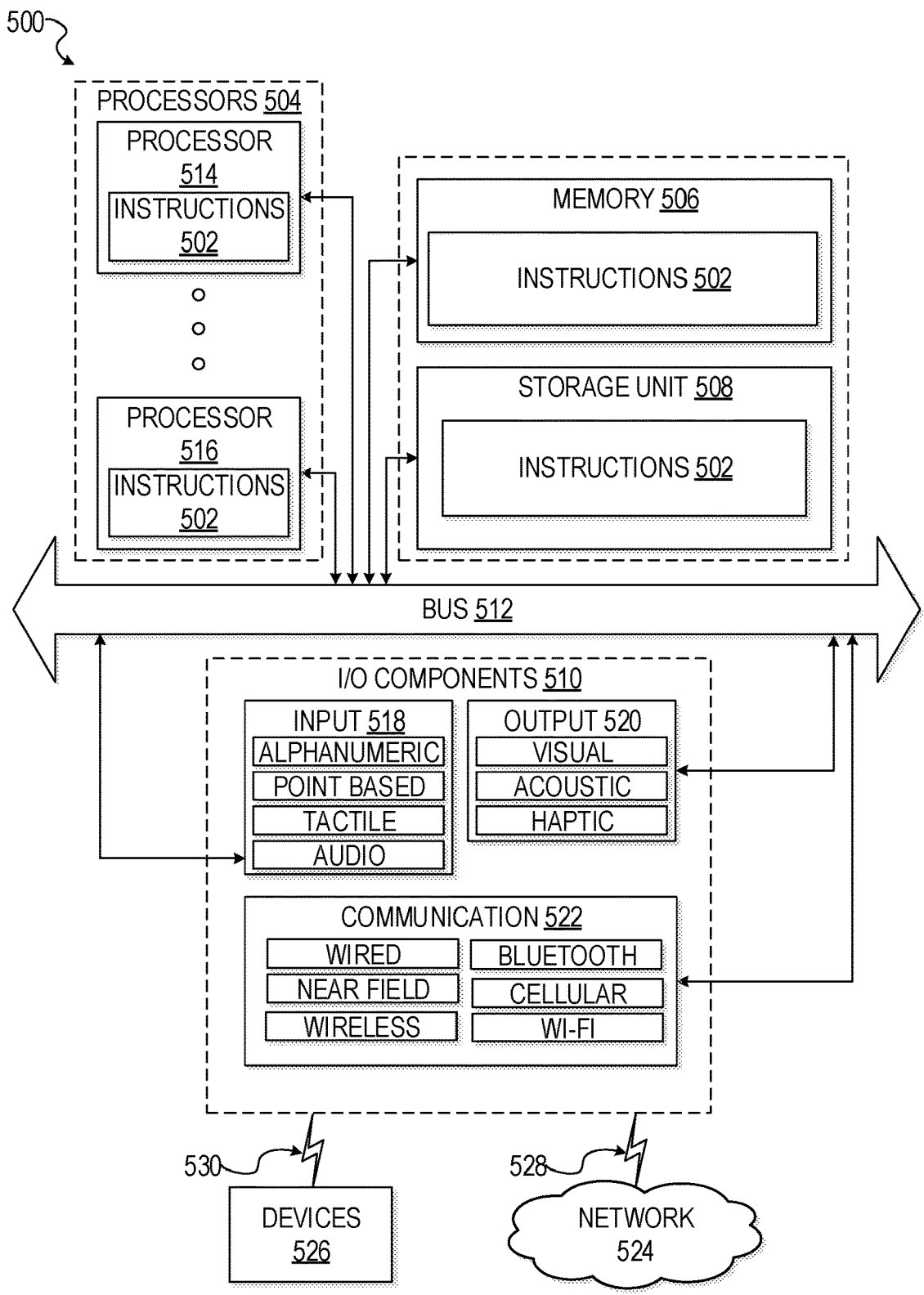
FIG. 5 shows a diagrammatic representation of a computing device in the example form of a computer system within which a set of instructions for causing the computing device to perform any one or more of the methodologies discussed herein may be executed.

FIG. 5 shows a block diagram illustrating components of a computing device 500, according to some example embodiments, able to read instructions from a machine-readable medium (e.g., a machine-readable storage medium) and perform any one or more of the methodologies discussed herein. Specifically, FIG. 5 shows a diagrammatic representation of computing device 500 in the example form of a system, within which instructions 502 (e.g., software, a program, an application, an applet, an app, a driver, or other executable code) for causing computing device 500 to perform any one or more of the methodologies discussed herein may be executed. For example, instructions 502 include executable code that causes computing device 500 to execute method 300 and 400. In this way, these instructions transform the general, non-programmed machine into a particular machine programmed to carry out the described and illustrated functions in the manner described herein. Computing device 500 may operate as a standalone device or may be coupled (e.g., networked) to other machines.

By way of non-limiting example, computing device 500 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 502, sequentially or otherwise, that specify actions to be taken by computing device 500. Further, while only a single computing device 500 is illustrated, the term "machine" shall also be taken to include a collection of computing devices 500 that individually or jointly execute instructions 502 to perform any one or more of the methodologies discussed herein.

Computing device 500 may include processors 504, memory 506, storage unit 508 and I/O components 510, which may be configured to communicate with each other such as via bus 512. In an example embodiment, processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 514 and processor 516 that may execute instructions 502. The term "processor" is intended to include multi-core processors that may comprise two or more independent processors (sometimes referred to as "cores") that may execute instructions contemporaneously. Although FIG. 5 shows multiple processors, computing device 500 may include a single processor with a single core, a single processor with multiple cores (e.g., a multi-core process), multiple processors with a single core, multiple processors with multiples cores, or any combination thereof.

Memory 506 (e.g., a main memory or other memory storage) and storage unit 508 are both accessible to processors 504 such as via bus 512. Memory 506 and storage unit 508 store instructions 502 embodying any one or more of the methodologies or functions described herein. In some embodiments, database 516 resides on storage unit 508. Instructions 502 may also reside, completely or partially, within memory 506, within storage unit 508, within at least one of processors 504 (e.g., within the processor's cache memory), or any suitable combination thereof, during execution thereof by computing device 500. Accordingly, memory 506, storage unit 508, and the memory of processors 504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 502. The term "machine-readable medium" shall also be taken to include any medium, or combination of multiple media, that is capable of storing instructions (e.g., instructions 502) for execution by a machine (e.g., computing device 500), such that the instructions, when executed by one or more processors of computing device 500 (e.g., processors 504), cause computing device 500 to perform any one or more of the methodologies described herein (e.g., method 300 and 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine will depend on the type of machine. For example, portable machines such as mobile phones will likely include a touch input device or other such input mechanisms, while a headless server machine will likely not include such a touch input device. It will be appreciated that I/O components 510 may include many other components that are not specifically shown in FIG. 5. I/O components 510 are grouped according to functionality merely for simplifying the following discussion and the grouping is in no way limiting. In various example embodiments, I/O components 510 may include input components 518 and output components 520. Input components 518 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 510 may include communication components 522 operable to couple computing device 500 to network 524 or devices 526 via coupling 528 and coupling 530, respectively. For example, communication components 522 may include a network interface component or other suitable device to interface with network 524. In further examples, communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1126 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    receiving, from a client device, a search query including a stack trace, the stack trace being a report of active stack frames during execution of a program;
    parsing the search query to identify a first error message included in the stack trace;
    searching an error discussion database based on the first error message included in the stack trace, the error discussion database including a set of user generated postings regarding programming errors, wherein searching the error discussion database comprises:
    identifying a subset of user generated postings from the set of user generated postings that include a first class name included in the stack trace;
    determining, for each respective user generated posting from the subset of user generated postings, a number of errors included in the stack trace that are also included in the respective user generated posting; and
    ranking the set of user generated postings based on the number of errors determined for each respective user generated posting, yielding a prioritized set of user generated postings; and
    providing, to the client device, a set of search results resulting from searching the error discussion database, the set of search results including user generated postings from the subset of user generated postings ordered based on the ranking.

2. The method of claim 1, further comprising:
    searching a class mapping table based on the first class name, the class mapping table including a listing of class names corresponding to programming classes and corresponding links to source code for each respective programming class, the listing of class names including at least one class name used during execution of the program; and
    providing, to the client device, a second set of search results resulting from searching the class mapping table.

3. The method of claim 2, wherein searching the class mapping table comprises:
    identifying a set of links corresponding to the first class name.

4. The method of claim 3, wherein providing the second set of search results to the client device comprises:
    transmitting, to the client device, the set of links corresponding to the first class name, the client device presenting the set of links on a display of the client device thereby enabling a user of the client device to select a link from the set of links to access source code corresponding to a programming class corresponding to the first class name.

5. The method of claim 1, wherein identifying the first error message included in the stack trace comprises:
identifying the first class name included in the stack trace, the first class name corresponding to a first programming class used during execution of the program; and
identifying at least the first error message included in the stack trace and corresponding to the first programming class.

6. The method of claim 1, wherein identifying the first error message included in the stack trace further comprises removing common terms.

7. The method of claim 6, wherein the common terms include timestamps.

8. A system comprising:
one or more computer processors; and
one or more computer-readable mediums storing instructions that, when executed by the one or more computer processors, cause the system to perform operations comprising:
receiving, from a client device, a search query including a stack trace, the stack trace being a report of active stack frames during execution of a program;
parsing the search query to identify a first error message included in the stack trace;
searching an error discussion database based on the first error message included in the stack trace, the error discussion database including a set of user generated postings regarding programming errors, wherein searching the error discussion database comprises:
identifying a subset of user generated postings from the set of user generated postings that include a first class name included in the stack trace;
determining, for each respective user generated posting from the subset of user generated postings, a number of errors included in the stack trace that are also included in the respective user generated posting; and
ranking the set of user generated postings based on the number of errors determined for each respective user generated posting, yielding a prioritized set of user generated postings; and
providing, to the client device, a set of search results resulting from searching the error discussion database, the set of search results including user generated postings from the subset of user generated postings ordered based on the ranking.

9. The system of claim 8, the operations further comprising:
searching a class mapping table based on the first class name, the class mapping table including a listing of class names corresponding to programming classes and corresponding links to source code for each respective programming class, the listing of class names including at least one class name used during execution of the program; and
providing, to the client device, a second set of search results resulting from searching the class mapping table.

10. The system of claim 9, wherein searching the class mapping table comprises:
identifying a set of links corresponding to the first class name.

11. The system of claim 10, wherein providing the second set of search results to the client device comprises:
transmitting, to the client device, the set of links corresponding to the first class name, the client device presenting the set of links on a display of the client device thereby enabling a user of the client device to select a link from the set of links to access source code corresponding to a programming class corresponding to the first class name.

12. The system of claim 8, the operations wherein identifying the first error message included in the stack trace comprises:
identifying the first class name included in the stack trace, the first class name corresponding to a first programming class used during execution of the program; and
identifying at least the first error message included in the stack trace and corresponding to the first programming class.

13. The system of claim 8, wherein identifying the first error message included in the stack trace further comprises removing common terms.

14. The system of claim 13, wherein the common terms include timestamps.

15. A non-transitory computer-readable medium storing instructions that, when executed by one or more computing devices, cause the one or more computing devices to perform operations comprising:
receiving, from a client device, a search query including a stack trace, the stack trace being a report of active stack frames during execution of a program;
parsing the search query to identify a first error message included in the stack trace;
searching an error discussion database based on the first error message included in the stack trace, the error discussion database including a set of user generated postings regarding programming errors, wherein searching the error discussion database comprises:
identifying a subset of user generated postings from the set of user generated postings that include a first class name included in the stack trace;
determining, for each respective user generated posting from the subset of user generated postings, a number of errors included in the stack trace that are also included in the respective user generated posting; and
ranking the set of user generated postings based on the number of errors determined for each respective user generated posting, yielding a prioritized set of user generated postings; and
providing, to the client device, a set of search results resulting from searching the error discussion database, the set of search results including user generated postings from the subset of user generated postings ordered based on the ranking.

16. The non-transitory computer-readable medium of claim 15, the operations further comprising:
searching a class mapping table based on the first class name, the class mapping table including a listing of class names corresponding to programming classes and corresponding links to source code for each respective programming class, the listing of class names including at least one class name used during execution of the program; and
providing, to the client device, a second set of search results resulting from searching the class mapping table.

17. The non-transitory computer-readable medium of claim 16, wherein searching the class mapping table comprises:
identifying a set of links corresponding to the first class name.

18. The non-transitory computer-readable medium of claim 17, wherein providing the second set of search results to the client device comprises:

transmitting, to the client device, the set of links corresponding to the first class name, the client device presenting the set of links on a display of the client device thereby enabling a user of the client device to select a link from the set of links to access source code corresponding to a programming class corresponding to the first class name.

19. The non-transitory computer-readable medium of claim 15, the operations wherein identifying the first error message included in the stack trace comprises:
  identifying the first class name included in the stack trace, the first class name corresponding to a first programming class used during execution of the program; and
  identifying at least the first error message included in the stack trace and corresponding to the first programming class.

20. The non-transitory computer-readable medium of claim 15, wherein identifying the first error message included in the stack trace further comprises removing common terms.

* * * * *